May 23, 1961  C. H. DOERSAM, JR  2,985,014
ANEMOMETER
Filed June 20, 1958  3 Sheets-Sheet 1
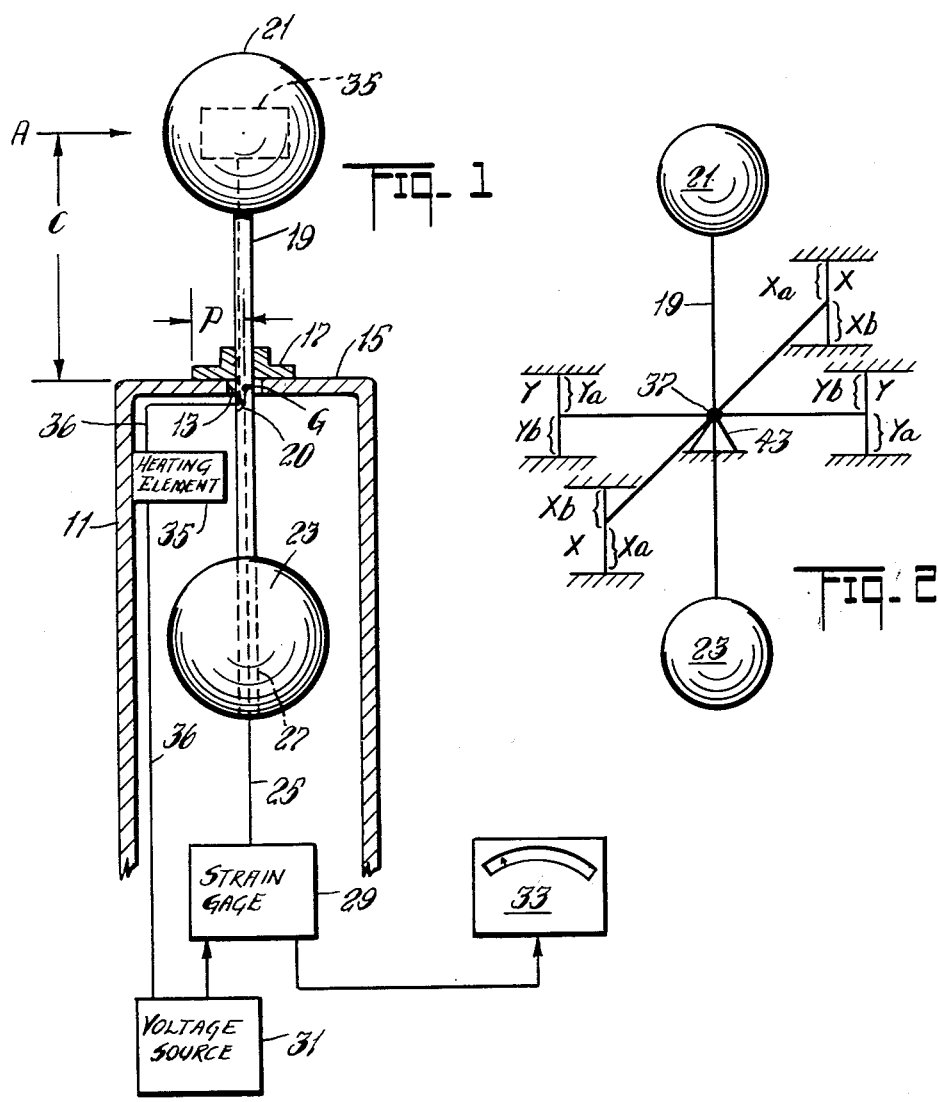
INVENTOR.
CHARLES H. DOERSAM JR.
BY
ATTORNEYS

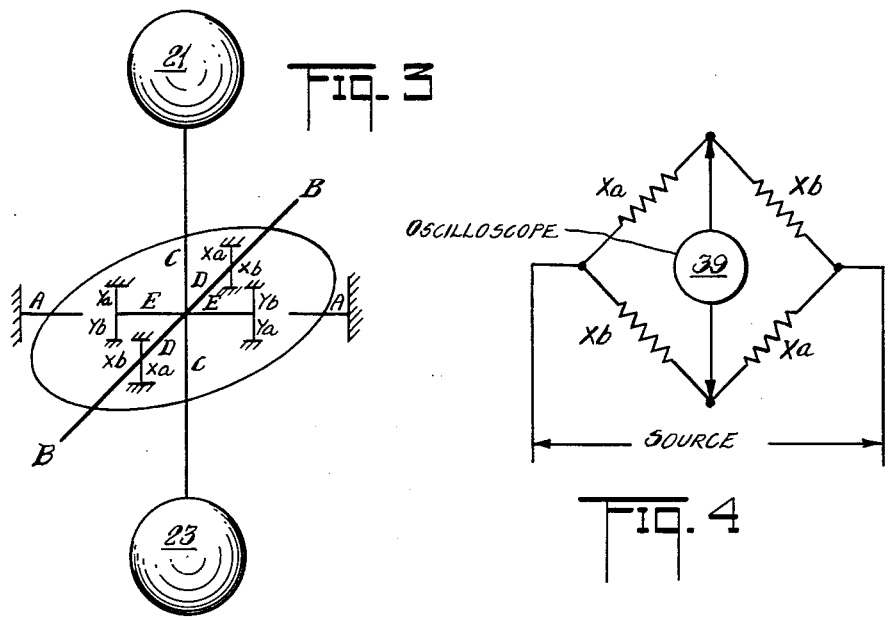
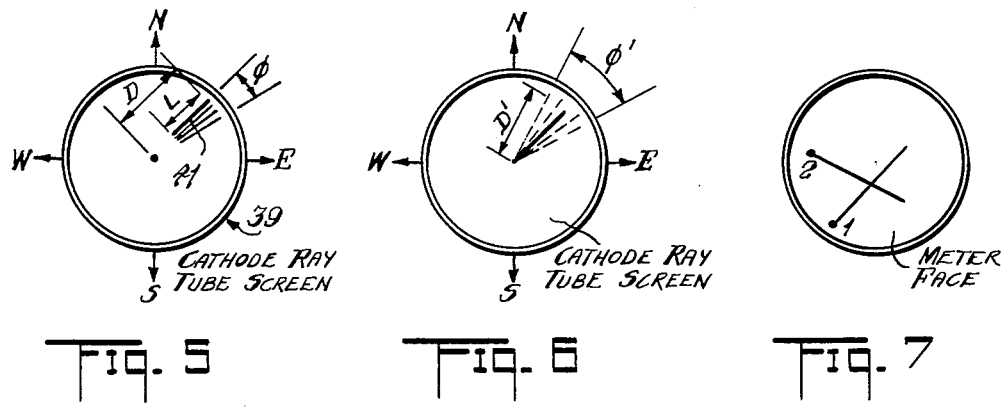

May 23, 1961     C. H. DOERSAM, JR     2,985,014
ANEMOMETER

Filed June 20, 1958     3 Sheets-Sheet 3

INVENTOR.
CHARLES H. DOERSAM JR.
BY
Louis B. Appleba
ATTORNEYS

United States Patent Office 2,985,014
Patented May 23, 1961

2,985,014
ANEMOMETER
Charles H. Doersam, Jr., 24 Winthrop Road, Port Washington, N.Y.
Filed June 20, 1958, Ser. No. 743,515
17 Claims. (Cl. 73—189)
(Granted under Title 35, U.S. Code (1952), sec. 266)

The invention described herein may be manufactured and used by or for the Government of the United States of America for governmental purposes without the payment of any royalties thereon or therefor.

This invention is a continuation-in-part of my applications Serial No. 282,255, filed April 14, 1952, and Serial No. 446,427, filed July 28, 1954, both cases now abandoned, and relates to improvements in fluid flow meters, and more particularly pertains to improvements in anemometers adapted for use in measuring wind or other gas velocities and directions of flow.

Conventional rotating cup anemometers and other types of anemometers heretofore employed (such as propellers and weather vane instruments) are subject to many disadvantages. In addition to their comparatively high cost of fabrication and complexity, they are usually characterized by such a high inertia as to have poor dynamic response on both the high and low ends of the wind-velocity scale. Further, they are susceptible to icing and other climatic difficulties and are subject to inordinately rapid wear of rotating elements, consequent decreasing precision and limited range. Such devices also fail to provide satisfactory means for varying range and type of measurement, and for correcting calibration according to incident air density.

The foregoing disadvantages are overcome by the subject anemometer, which provides a means of obtaining and measuring the flow drag of a sphere and indicating it remotely as velocity. This result stems from the application of the principle that the drag of a sphere in the flow conditions encountered normally by an anemometer can be made to be a known function of wind velocity by proper selection of sphere diameter in order to stay within the linear range of the Reynolds number vs. drag log curve.

The principal object of this invention is to provide an inexpensive, simple and accurate means of measuring wind or gas velocities and directions of flow.

Another object is to provide an anemometer characterized by low inertia and consequently by good dynamic response at both the high and low ends of the wind velocity scale.

A further object is to provide an anemometer that dispenses with rotating elements and is capable of operating accurately under extreme weather conditions.

Still another object is to provide an anemometer having facile means for varying range and type of measurement, and for correcting calibration according to incident air density.

Another object is to provide an anemometer that affords simple and precise means of measuring wind or gas velocity and direction with good dynamic response.

Other objects and many of the attendant advantages of this invention will be readily appreciated as the same becomes better understood by reference to the following detailed description when considered in connection with the accompanying drawing wherein:

Fig. 1 is a fragmentary elevation, partly in section and partly schematic, of an anemometer, showing a preferred embodiment of the invention;

Fig. 2 is a diagrammatic representation of a modified form of the invention, illustrating the incident forces and their interrelation;

Fig. 3 is a diagrammatic representation of an alternate mode of pivoting elements of the measuring circuit;

Fig. 4 is a wiring diagram of a bridge circuit adapted to be applied in the subject device; and Fig. 5 is a diagrammatic representation of a cathode ray oscilloscope type indicator, showing how velocity and direction intelligence can be derived from the subject device;

Fig. 6 is a diagrammatic representation of an indicator, similar to Fig. 5, wherein a standard polar type sweep is used;

Fig. 7 is a diagrammatic representation of an indicator of such intelligence using an aircraft type cross-pointer;

Similar numerals refer to similar parts throughout the several views.

Figure 8:
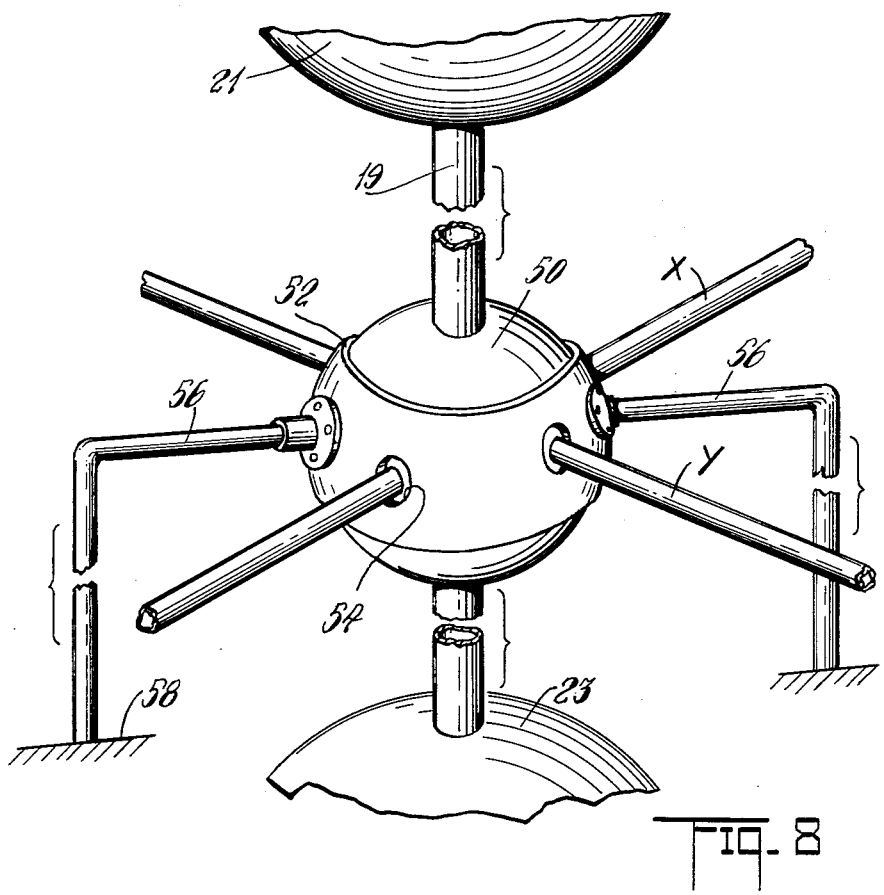
Fig. 8 is a representation of a ball-and-socket type joint usable in the embodiment of Fig. 2.

In the preferred embodiment of the anemometer shown in Fig. 1, a casing 11 is provided with an opening 13 in its top 15. A stepped collar or annulus 17 is seated upon said top 15 and secures a spacing element, tube 19, which extends through said opening 13. The tube 19 is of somewhat smaller diameter than the opening 13, so that said tube has extremely limited freedom to tilt in any direction when the annulus 17 is pivoted on its lower rim, as hereinafter described.

Drag element 21, which is preferably a sphere, is secured to the upper end of tube 19, and sphere 23 is secured to the lower end of tube 19 inside the casing 11. Tension element 25 is a wire characterized by changes in electrical resistance in proportion to changes in the strain existing therein due to the stress applied thereto. Said element 25 is affixed at one end to the interior wall of tube 19 and extends through the lower portion of said tube and through a diametral bore 27 in sphere 23, the other end of said element 25 being coupled to a bridge-type strain gage 29 that is fed by a voltage source 31. The output of the strain gage 29 is transmitted to an indicator 33. Said bridge-type strain gage 29 consists of a conventional four-legged Wheatstone bridge in which the tension element 25 is placed in one leg. Another type of gage that can be employed is one where as part of it is strained the other part is unstrained, said strained and unstrained parts being placed in opposite legs of a bridge. Such an arrangement is to be hereinafter more fully described with reference to Fig. 4.

Heating elements 35 mounted in casing 11 and sphere 21, are supplied by voltage source 31 through an insulated wire 36 that enters tube 19 through a hole 20 therein located directly below point G. It is to be noted that the motion of spheres 21 and 23 is extremely slight because only strain is measured and the addition of wire 36 in tube 19 and sphere 21 does not tend to unbalance the system.

The operation of the anemometer is apparent from the foregoing description. The sphere 21 is acted on by the gas stream to be measured, such stream exerting a force indicated by the arrow A. The force A is amplified by the ratio of the vertical distance (C) between the center of sphere 21 and the point of contact of the rim of annulus 17 and top 15, and the horizontal distance (P) between the axis of tube 19 and said rim, since the annulus 17 is fastened to shaft 19 and is therefore theoretically free to pivot upon a circular locus of fulcrum points provided by the line of contact of said rim with said top 15. In practice, the amount of tilt in any direction is limited, by the extent of contact surface between the annulus 17 and the top 15, to an extremely minute amount which is virtually imperceptible to the naked eye. Limitation of the amount of tilt is effected because it is desired to measure the velocity of flow of fluid by means of its strain effect, rather than by means of its motional effect. Thus, the limited amount of tilt that is required is only that sufficient to provide a tension on tension element 25, the maximum allowable tilt being just under the amount which would exceed the elastic limit of the tension element. This minute tilting action transmits the amplified force A to point G, the end of tension element 25, as a tension. Such tension is in turn coupled by tension element 25 to bridge type strain gage 29, which is supplied by a voltage source 31, and an indication is transmitted to the indicator 33. It should be noted that the maximum permissible amount of tilt can approach as a limit, but cannot be allowed to equal, the amount of tilt which would cause the strain in the tension wire to exceed the elastic limit of the wire. However, the desirable condition is the least amount of tilt which will provide convenient readings of fluid flow and this depends in part upon the electrical characteristics of the tension wire and the sensitivity of the strain gage. With contemporary equipment, the amount of tilt of the drag assembly (spheres 21 and 23 and tube 19) is virtually unnoticeable. (In fact, it may be so minute that the strain in the tension element 25 may be considered to be caused only by the strain existing in the tube 19 to which it is affixed, rather than to any tilting movement of the tube.)

Sphere 23, which is protected from the air stream A by the casing 11, balances the sphere 21 assembly statically and dynamically, so that such assembly has its static and dynamic center at the point of support to cancel any forces due to gravity or spurious accelerations.

In the modified forms of the invention shown diagrammatically in Figs. 2 to 5, the drag on sphere 21 which is balanced dynamically, as in Fig. 1, by sphere 23, is resolved into X and Y coordinates. The assembly is rigid at the intersection 37 of said coordinates, the tube 19 and the X and Y arms being maintained at right angles to each other with deflection of the sphere 21 by the force to be measured causing a pivoting of the assembly on the fulcrum 43 (Fig. 2), which can best be visualized as a ball and socket type joint.

The stresses and hence the strains in all the wires $Xa$, $Xb$, $Ya$ and $Yb$ are prestressed and set, initially, to be equal to each other with zero wind and no disturbing forces on the spheres. Such setting is adjusted so that it is equal to one half the maximum with maximum force applied to the measuring sphere. In this manner as the applied force to be measured increases from zero to a maximum value, the force in one leg increases uniformly from one half to maximum while the force in the corresponding opposite leg decreases from one half to minimum (zero). Thus the forces involved are measured by means of the pre-stressed resistance wire arranged in a bridge circuit in such a manner that the applied stress increases with force on the sphere 21 in one leg and decreases in the other leg, thus providing a stronger signal.

In the bridge provided for each coordinate axis, legs $Xa$ and $Yb$ are preset in accordance with predetermined correction factors, and legs $Xb$ and $Ya$ are the prestressed resistance wires provided (see Figs. 2 and 4). Each of the two bridges therefore develops a voltage in response to strain on the wires provided, and said voltage can be applied to a cathode ray oscilloscope indicator 39, as shown in Fig. 5. The presentation on the indicator 39 is a marker line 41, the distance "D" being proportional to the velocity of the wind being measured and pointing in the direction of such wind; the distance "D" represents the vector sum of the $x$ and $y$ incident forces. The length "L" indicates the intensity of gusts, and the change in angular position of the marker line, $\phi$, indicates the steadiness of wind direction. That is, the variation in direction is represented by the variation angle $\phi$ (in Fig. 6, $\phi'$) and the intensity of the line at any azimuth indicates the duration of wind at that direction. The length D (in Fig. 6, D') indicates the speed of the wind and variation in D or D' indicates the intensity of gusts.

Similarly, the same information can be displayed on a standard aircraft type cross pointer indicator, as shown in Fig. 7, to afford use as a helicopter air speed indicator. The subject device is adapted to be mounted above and behind the slip stream of the torque rotor, or above the pilot, because it can operate satisfactorily even when subjected to craft accelerations. The device will provide accurate indication of air speed up, down, left, right, fore and aft, thus serving as a rate of climb indicator when coupled with another unit mounted perpendicular to the air speed indicator. In this case an additional indicator would be needed to display the up-down axis. During hovering of the helicopter near the ground, the device will serve as a ground wind and gust speed indicator, and will show lateral as well as fore and aft velocity.

A ball-and-socket joint which may be utilized in the embodiment of Fig. 2 is shown in Fig. 8. Tube 19 is affixed to a ball 50, as are also the X and Y arms. The ball 50 is loosely gridled by a band of metal 52 which contains excised areas 54 through which the arms X and Y extend. Friction between the ball 50 and the band 52 should be minimized. The band 52 is anchored by some means, such as metal rods 56, to a supporting structure 58. As in the case of the embodiment of Fig. 1, the amount of tilting motion of the sphere 21 and the tube 19, and thus the amount of motion of the X and Y arms, is very minute—just sufficient to exert a tension and strain the tension wires. The amount of motion is limited by making the size of the excised areas 54 just a very small amount greater than the outer diameter of the X and Y arms. The encircling edges of the band 52 then limit the movement of the X and Y arms to an amount which will not stress the tension wires beyond their elastic limit. It should be noted that the size of the excised areas 54 is exaggerated for clarity in Fig. 8.

Figure 9:
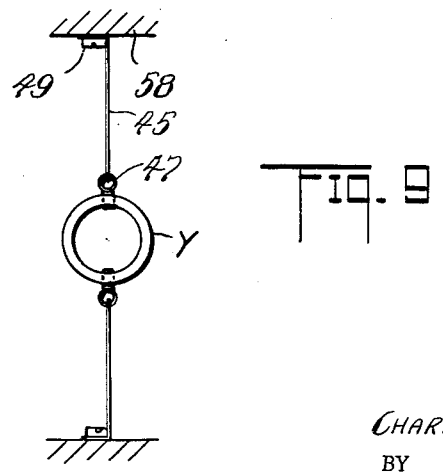
Fig. 9 is a diagrammatic representation of a method for affixing the tension wires to the arms of the embodiment of Fig. 2.

Fig. 9 illustrates a relatively simple method for mounting the tension wires to the X and Y arms of the embodiment of Fig. 2. Eye-bolts 47 are screwed through the top and bottom surfaces of the X and Y arms near the end of each arm. One end of the tension wire 45 is affixed to an eye-bolt 47 and the other end is secured to the supporting structure 58 by means of a screw or bolt 49. Tension can be increased or decreased as desired by turning the eye-bolts.

It is possible to suspend the drag assembly by means of the tension wires only. In this case, the band 52 would not be in contact with the ball 50 at all but would be spaced from it. The function of the band 52 would then be solely the limitation of the tilting movement of the drag assembly.

The gimbal system mounting shown in Fig. 3, is a modified form of the device. With A—A representing the fixed housing, the gimbal ring A—B—A—B pivots in the other gimbal A—A in the bearings B—B. The spheres 21 and 23 are attached rigidly to the rod C—C, and the rods D—D and E—E are in turn attached rigidly to the rod C—C. The resistance pickups $Xa$, $Xb$, $Ya$ and $Yb$ are fastened to their respective rods and to the housing. Thus, as in the device of Fig. 2, an equal tension is provided on each of each resistance element, each such element being prestressed to half of its full scale value, to afford an approximate balance and provide a basis for transmittal of strain intelligence and conversion of such intelligence into representations of wind direction and velocity.

It is thus apparent that the subject device provides an inexpensive, simple and accurate means of measuring wind velocity. Since inertias can be made appreciably lower than the inertias of anemometers heretofore employed, the device herein disclosed has good dynamic response and consequent accuracy on both the high and low ends of the wind-velocity scale as well as usefulness for gust measurements. The provision of heating elements in the case and sphere decreases susceptibility to icing and other climatic difficulties encountered with conventional anemometers. Construction can be rugged to minimize the effect of shock, and there are no rotating elements subject to bearing wear as in cup-type anemometers. Ranges of the instrument can be changed facilely by varying the diameter of the spheres 21 and 23, and by varying the dimensions C and P, and corrections for various air density conditions can be introduced readily either at the pickup or at the indicator.

Obviously many modifications and variations of the present invention are possible in the light of the above teachings. It is therefore to be understood that within the scope of the appended claims the invention may be practiced otherwise than as specially described.

I claim:

1. A device for measuring the velocity of flow of a fluid comprising, in combination: supporting means; a drag member against which a fluid can exert a force proportional to its velocity of flow; spacing-and-tilting means comprising a longitudinal spacing element and a tilting element positioned medially thereon, said drag member being affixed to one end of said spacing element, said tilting element being supported by said supporting means and providing said drag member with a pivot point through which the longitudinal axis of said spacing-and-tilting means extends; a mass affixed to said spacing element on the section between said tilting element and the other end of said spacing element at a point where the mass causes the center of gravity of the drag member-spacing element-mass assembly to occur at said pivot point, said last-named assembly thus being statically and dynamically balanced; a shield for said mass and the section of spacing element between said mass and the tilting element, said shield protecting said mass and said section of spacing element from the force effects of the flow of said fluid; tension means fixed at one point relative to said supporting means and coupled at another point to said spacing-and-tilting means, said tension means being strained by the tilt of said spacing element in proportion to the force exerted against said drag member by the flow of fluid; and means for determining the amount by which said tension means is strained.

2. A device as set forth in claim 1, wherein said drag member is a sphere, said spacing element comprises a rod and said tilting element comprises a ball-and-socket type joint.

3. A device as set forth in claim 1, wherein said drag member is a sphere, said spacing element comprises a tube, said tilting element comprises an annulus encircling said tube and said tension means comprises a wire, said other end of which is fastened directly to said tube.

4. A device as set forth in claim 2, including a second rod whereby said tension means is coupled to the tilting element of said spacing-and-tilting means, one end of said second rod being affixed to said tilting element and the other end of said second rod being affixed to said tension means, a third rod and second tension means, said third rod lying in the plane of said second rod but extending in a perpendicular direction thereto, said third rod and said second tension means being structurally arranged with respect to the supporting means and tilting element in the same manner as said second rod and its associated tension means.

5. A device for measuring the velocity of flow of a fluid comprising, in combinaion: spatially fixed supporting means; a drag member against which a fluid can exert a force proportional to its velocity of flow; spacing-and-tilting means comprising a longitudinal spacing element and a tilting element positioned medially thereon, said drag member being affixed to one end of said spacing element, said tilting element being supported by said supporting means and providing said drag member with a pivot point through which the longitudinal axis of said spacing-and-tilting means extends, said supporting means and said tilting element acting to limit actual tilting movement of said drag member in response to fluid-flow force exerted against it; a mass affixed to said spacing element on the section between said tilting element and the other end of said spacing element at a point where the mass causes the center of gravity of the drag member-spacing element-mass assembly to occur at said pivot point, said last-named assembly thus being statically and dynamically balanced; a shield for said mass and the section of spacing element between said mass and the tilting element, said shield protecting said mass and said section of spacing element from the force effects of the flow of said fluid; tension means fixed at one point relative to said supporting means and coupled at another point to said spacing-and-tilting means, said tension means being strained by the limited amount of tilt of said spacing element in proportion to the force exerted against said drag member by the flow of fluid, the maximum tilting movement of said drag member being limited to an amount below that which would stress the tension means beyond its elastic limit; and means for determining the amount by which said tension means is strained.

6. A device as set forth in claim 5, wherein said drag member is a sphere, said spacing element comprises a rod and said tilting element comprises a ball-and-socket type joint.

7. A device as set forth in claim 5, wherein said drag member is a sphere, said spacing element comprises a tube, said tilting element comprises an annulus encircling said tube and said tension means comprises a wire, said other end of which is fastened directly to said tube.

8. A device as set forth in claim 6, including a second rod whereby said tension means is coupled to the tilting element of said spacing-and-tilting means, one end of said second rod being affixed to said tilting element and the other end of said second rod being affixed to said tension means, a third rod and second tension means, said third rod lying in the plane of said second rod but extending in a perpendicular direction thereto, said third rod and said second tension means being structurally arranged with respect to the supporting means and tilting element in the same manner as said second rod and its associated tension means.

9. A device for measuring the velocity of flow of a fluid comprising, in combination: a drag assembly comprising a drag member against which a fluid can exert a force proportional to its velocity of flow, a spacing element and a counterbalancing member, said drag and counter-balancing members being affixed to said spacing element at spaced points, the center of gravity of said assembly lying on said spacing element between said drag and counter-balancing members; means supporting said drag assembly so that it would be free to pivot about its center of gravity under the influence of a flow of fluid but checking actual pivotal movement of said drag assembly so that said flow of fluid acts to produce a proportionate strain rather than a motion in said drag assembly; tension means fixed at one point relative to said supporting-and-checking means and coupled at another point to said drag assembly, said tension means being proportionately strained by the tension in said drag assembly; shielding means for shielding said counterbalancing member and the section of spacing element lying between said counterbalancing member and the center of gravity of said drag assembly from said flow of fluid; and means for determining the amount by which said tension means is strained.

10. A device as set forth in claim 9, wherein said drag member and said counterbalancing members are identical spheres and said spacing element is longitudinal in nature.

11. A device as set forth in claim 10, wherein said supporting-and-limiting means includes a base, and an annulus encircling and affixed to said spacing element at the center of gravity of said drag assembly, said annulus being supported by said base.

12. A device as set forth in claim 9, wherein said supporting-and-limiting means comprises a ball and an encircling supporting band in which said ball may rotate in any direction and said tension means includes at least one pair of rods extending from said ball in opposite directions and tension elements affixed to said rods so that tilting movement of said drag assembly transmits a stress through said rods to said tension elements whereby said tension elements are strained, said supporting band having excised areas through which said rods extend the edges of said excised areas acting to restrain movement of said rods so that the tilting movement of said drag assembly is limited to an extremely small amount which is less than that which would exceed the elastic limit of said tension elements.

13. A device for measuring the velocity of flow of a fluid comprising, in combination: a drag assembly comprising a drag member against which a fluid can exert a force proportional to its velocity of flow, a spacing element and a counterbalancing member, said drag and counterbalancing members being affixed to said spacing element at spaced points, the center of gravity of said assembly lying on said spacing element between said drag and counterbalancing members; means supporting said drag assembly so that it is free to tilt about its center of gravity in any direction but limiting the actual amount of said tilt; tension means fixed at one point relaitve to said supporting-and-limiting means and coupled at another point to said drag assembly, said tension means being strained by the tilt of said drag assembly in proportion to the velocity of flow of fluid against said drag member, the tilt of said drag assembly being limited to an amount sufficient to place a strain upon said tension means but insufficient to cause the elastic limit of said tension means to be exceeded; shielding means for shielding said counterbalancing member and the section of spacing element lying between said counterbalancing member and the center of gravity of said drag assembly from said flow of fluid; and means for determining the amount by which said tension means is strained.

14. An anemometer comprising a sphere, a support for said sphere, an axis about which said support is tiltable to a limited extent in any direction when a force is exerted against the sphere, a group of fulcrum points for said support encompassing said axis and lying in a plane intersecting said axis, means balancing said sphere statically and dynamically relative to the intersection between said axis and said fulcrum-point plane, a casing, said casing enclosing said sphere-balancing means, whereby said balancing means is shielded from external forces, wire means that varies in electrical resistance as its tension varies, said wire means being fixed at one end relative to said casing, means mechanically coupling the other end of said wire means to said support at a point corresponding to the intersection of said fulcrum-point plane and said axis whereby the tension of said wire means varies in response to the tilt of said support, the amount of tilt of said support being limited to that which is required to place said wire means under various amounts of tension up to a predetermined limit, and electrical means for measuring the change in tension of said wire.

15. Then anemometer of claim 14, having a base and a circular collar fixed to the support and seated on the base whereby application of force to said sphere in any direction pivots the collar, support and sphere on a fulcrum at the juncture of a point on the rim of said collar and said base.

16. The anemometer of claim 14 wherein said balancing means comprises a second sphere similar to the first sphere secured to the opposite end of said support and enclosed in said casing whereby wind pressure exerted against the first sphere is not exerted against the second sphere.

17. An anemometer comprising two rigid elements positioned in a plane, intersecting at right angles and joined rigidly at their point of intersection, a third rigid element secured to said two elements and positioned perpendicularly thereto, a sphere supported by said third element at the end of said third element, means pivotally supporting said three elements at said point of intersection, a pair of perpendicular wires at the ends of said first element each connected at a point on said wire to and supporting said element, the four portions of the two wires above and below the point of meeting of the wires and the first element being the four sides of a Wheatstone bridge, a cathode ray oscilloscope connected electrically to said bridge and operated by the voltage developed therein, a second pair of wires and a second Wheatstone bridge connected similarly to the second rigid element, and means for applying the voltage developed in said second bridge to said oscilloscope, whereby a wind against said sphere pivots the three elements and changes the tension and the electrical resistances in the parts of said wires, thus unbalancing the bridges and producing an observable effect on said oscilloscope.

References Cited in the file of this patent

UNITED STATES PATENTS

| | | |
|---|---|---|
| 2,098,099 | Kahn | Nov. 2, 1937 |
| 2,375,227 | Hillman | May 8, 1945 |
| 2,543,020 | Hess | Feb. 27, 1951 |
| 2,613,536 | Jakosky | Oct. 14, 1952 |
| 2,665,583 | Anjanos | Jan. 12, 1954 |

FOREIGN PATENTS

| | | |
|---|---|---|
| 1,839 | Great Britain | July 12, 1865 |
| 631,973 | Great Britain | Nov. 14, 1949 |
| 961,641 | France | Nov. 21, 1949 |